United States Patent
Guo et al.

(10) Patent No.: US 12,266,814 B2
(45) Date of Patent: Apr. 1, 2025

(54) BATTERY AND ELECTRICITY CONSUMING APPARATUS

(71) Applicant: CONTEMPORARY AMPEREX TECHNOLOGY (HONG KONG) LIMITED, Hong Kong (CN)

(72) Inventors: Haijian Guo, Fujian (CN); Qiuhong Cai, Fujian (CN); Xiaoteng Huang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/644,161

(22) Filed: Apr. 24, 2024

(65) Prior Publication Data
US 2024/0274952 A1    Aug. 15, 2024

Related U.S. Application Data

(63) Continuation of application No. PCT/CN2022/123919, filed on Oct. 8, 2022.

(30) Foreign Application Priority Data

Jun. 22, 2022 (CN) .......................... 202210708033.6

(51) Int. Cl.
*H01M 50/242* (2021.01)
*H01M 10/658* (2014.01)
(Continued)

(52) U.S. Cl.
CPC ....... *H01M 50/242* (2021.01); *H01M 10/658* (2015.04); *H01M 50/209* (2021.01); *H01M 50/289* (2021.01)

(58) Field of Classification Search
CPC .......................... H01M 50/242; H01M 50/289
See application file for complete search history.

(56) References Cited

U.S. PATENT DOCUMENTS

| 2013/0230759 A1 | 9/2013 | Jeong et al. |
| 2020/0075988 A1 | 3/2020 | Omura et al. |

(Continued)

FOREIGN PATENT DOCUMENTS

| CN | 103078076 A | 5/2013 |
| CN | 209447945 U | 9/2019 |

(Continued)

OTHER PUBLICATIONS

International Search Report and Written Opinion mailed on Mar. 15, 2023, received for PCT Application PCT/CN2022/123919, filed on Oct. 8, 2022, 12 pages including English Translation.

(Continued)

*Primary Examiner* — Maria Laios
*Assistant Examiner* — Jordan E Berresford
(74) *Attorney, Agent, or Firm* — XSENSUS LLP

(57) ABSTRACT

The present application discloses a battery and an electricity consuming apparatus. The battery includes a plurality of battery cells stacked in a first direction and an isolation assembly. The isolation assembly includes a buffer component arranged between two adjacent battery cells, the spacing between the two adjacent battery cells in the first direction is D, an area of a surface of the buffer component abuts against the battery cell is S1, and a size of the buffer component in the first direction in an uncompressed state is h1; a force F applied by the battery cell to the buffer component meets: 500N≤F≤10000N, in which the stress M of the buffer component obtained according to a stress strain curve of the buffer component is $26*(h1-D)/h1)^2 - 0.09*(h1-D)/h1$ in MPa, and by combining the area S1, the force F is obtained as F=S1*M.

8 Claims, 5 Drawing Sheets

(51) Int. Cl.
*H01M 50/209* (2021.01)
*H01M 50/289* (2021.01)

(56) References Cited

U.S. PATENT DOCUMENTS

| | | |
|---|---|---|
| 2020/0212396 A1 | 7/2020 | Chen et al. |
| 2021/0151815 A1 | 5/2021 | Milobar et al. |
| 2021/0218100 A1 | 7/2021 | Shao et al. |
| 2022/0115734 A1 | 4/2022 | Jung |
| 2022/0247040 A1* | 8/2022 | Kogami .............. H01M 50/431 |

FOREIGN PATENT DOCUMENTS

| | | | |
|---|---|---|---|
| CN | 209880670 U | | 12/2019 |
| CN | 213150871 U | | 5/2021 |
| CN | 214227007 U | * | 9/2021 |
| CN | 216563345 U | | 5/2022 |
| CN | 114784441 A | | 7/2022 |
| JP | 2011-188002 A | | 9/2011 |
| JP | 2014-150039 A | | 8/2014 |
| JP | 2019-200840 A | | 11/2019 |
| WO | 2021/177205 A1 | | 9/2021 |

OTHER PUBLICATIONS

Notification to Grant Patent Right mailed on Jul. 29, 2022, received for CN Application 202210708033.6, 8 pages including English Translation.

\* cited by examiner

BATTERY AND ELECTRICITY CONSUMING APPARATUS

CROSS-REFERENCE TO RELATED APPLICATIONS

The present application is a continuation of International Application No. PCT/CN2022/123919, filed on Oct. 8, 2022, which claims the priority of Chinese patent application No. 202210708033.6 entitled "Battery and Electricity Consuming apparatus" and filed on Jun. 22, 2022, both of which are hereby incorporated by reference in their entireties.

TECHNICAL FIELD

The present application relates to the field of battery technology, particularly a battery and an electricity consuming apparatus.

BACKGROUND

Battery cells are widely used in electronic devices, such as mobile phones, laptops, battery cars, electric vehicles, electric planes, electric ships, electric toy cars, electric toy ships, electric toy planes, and electric tool. The battery cell can include a cadmium nickel battery cell, a hydrogen nickel battery cell, a lithium-ion battery cell, and a secondary alkaline zinc manganese battery cell, etc.

In the development of the battery technology, how to improve the cycling performance of the battery cell is an important research direction in the battery technology.

SUMMARY

The present application provides a battery and an electricity consuming apparatus, which can improve the cycling performance of the battery.

In a first aspect, the present application provides a battery, which includes a plurality of battery cells and an isolation assembly. The plurality of battery cells are stacked in a first direction. The isolation assembly includes a buffer component provided between two adjacent battery cells and the spacing between the two adjacent battery cells along the first direction is D. The area of the surface of the buffer component which abuts against the battery cell is S1, and the size of the buffer component in the first direction in an uncompressed state is h1. A force F applied by the battery cell to the buffer component shall meet: $500N \leq F \leq 10000N$, in which a stress M of the buffer component obtained according to a stress strain curve of the buffer component is $26*(h1-D)/h1)^2 - 0.09*(h1-D)/h1$ in MPa, and by combining with the area S1 of the surface of the buffer component which abuts against the battery cell, the force F applied by the battery cell to the buffer component is obtained as $F = S1*M$.

In the above technical solution, an appropriate value of h1 is selected according to the above formula and the value of D is further defined, which can not only ensure that the buffer component meets the overall stiffness of the battery, and reduce the risk of battery failure, but also alleviate the limitation of the buffer component on the expansion degree of the battery cell and improve the cycling performance of the battery cell during the charging and discharging.

In some embodiments, the isolation assembly further includes a heat insulation component arranged between two adjacent battery cells and connected to a buffer component; the buffer component is provided along the periphery of the insulation component.

In the above technical solution, a heat insulation component is arranged between two adjacent battery cells. The heat insulation component can reduce the heat transfer between the two adjacent battery cells, reduce the mutual influence of heat generated by the two adjacent battery cells, and maintain the normal cycling performance of the battery cells. The buffer component is connected to the heat insulation component to improve the structural strength of the isolation assembly and also facilitate assembling.

In some embodiments, the size of the battery cell in the first direction is C, and the size of the heat insulation component in the first direction in an uncompressed state is h2, the maximum compression rate of the heat insulation component during battery charging and discharging is a, and C, H2, a, and D meet: $0.01C \leq D-(1-a)h2 \leq 0.2C$.

In the above technical solution, the above formula relates the size of the heat insulation component, the maximum compression rate of the heat insulation component, and the spacing between two adjacent battery cells in the first direction together, and imposes numerical limitations on their relationship. Therefore, the above formula can be used to select the size of the heat insulation component in the first direction and the spacing between two adjacent battery cells in the first direction, which is convenient and efficient for meeting the heat insulation requirement of the battery cell, and balancing the energy density of the battery and the cycling performance of the battery cell.

In some embodiments, the area of the surface of the heat insulation component which abuts against the battery cell is S2, and S1 and S2 meet $S2/(S2+S1) \geq 0.7$. $S2/(S2+S1)$ is set to be greater than or equal to 0.7 so as to limit the area ratio of the heat insulation component to the buffer component and meet the insulation requirement between two battery cells.

In some embodiments, the buffer component surrounds the outer side of the heat insulation component. The buffer component is disposed around the heat insulation component, which not only plays a role of sealing and shaping, but also attains good structural stability and a larger area of the buffer component.

In some embodiments, the heat insulation component is clamped to the buffer component. The heat insulation component and the buffering component are connected by clamping, which is not only convenient and efficient, but also attains good structural stability.

In some embodiments, the size of the heat insulation component in the first direction in an uncompressed state is h2, and h2 and D satisfy the following conditions: $h2 \leq D$. The size h2 of the heat insulation component in the first direction in an uncompressed state is set to be less than or equal to the distance D between the two adjacent battery cells in the first direction, in order to reduce the material consumption of the heat insulation component and reduce the cost of the isolation assembly.

In some embodiments, h1 and D satisfy: $h1 > D$.

In the above technical solution, the size h1 of the buffer component in the first direction in an uncompressed state is set to be greater than the distance D between two adjacent battery cells in the first direction. Therefore, after the battery cell and the isolation assembly are assembled, the buffer component plays a role in improving the overall stiffness of the battery and absorbing the tolerance in assembling into the group.

In some embodiments, the heat insulation component includes a heat insulation layer and a first film layer, and the first film layer is arranged on the surface of the insulation layer facing the battery cell. The buffer component includes a buffer layer and a second film layer, and the second film layer is arranged on the surface of the buffer layer facing the battery cell. The first and second film layers are integrally provided. The first and second film layers have the functions of waterproofing, moisture-proof, overall packaging, and increasing the flatness between the heat insulation component and the buffer component. The first and second film layers that are integrally provided can connect the heat insulation layer and the buffer layer to improve the overall structural strength of the isolation assembly.

In the second aspect, the present application provides an electricity consuming apparatus including a battery according to any embodiment of the first aspect, and the battery is configured to provide electrical energy.

BRIEF DESCRIPTION OF THE DRAWINGS

The features, advantages, and technical effects of exemplary embodiments of the present application will be described below with reference to the accompanying drawings.

Figure 1:
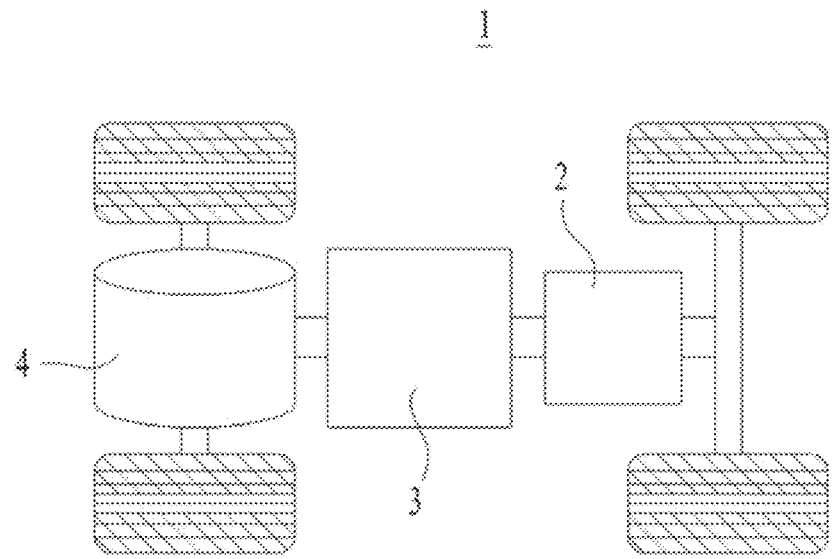
FIG. 1 is a structural schematic diagram of an electricity consuming apparatus according to an embodiment of the present application.

The specific embodiments are marked with the reference signs as follows:

1. Vehicle; 2. Battery; 3. Controller; 4. Motor; 5. Casing; 5a. First casing part; 5b. Second casing part; 5c. Accommodation space; 6. Battery module; 7. Battery cell; 8. Isolation assembly; 81. Buffer component; 811. Buffer layer; 812. Second film layer; 82. Heat insulation component; 821. Heat insulation layer; 822. First film layer; X. First direction.

DETAILED DESCRIPTION

In order to make the purpose, technical solution, and advantages of the embodiments of the present application clearer, the technical solution in the embodiments of the present application will be clearly described below in conjunction with the accompanying drawings. Obviously, the described embodiments are a part of the embodiments of the present application, not all of the embodiments. Based on the embodiments in the present application, all other embodiments obtained by ordinary skilled person in the art without creative labor fall within the scope of protection in the present application.

Unless otherwise defined, all technical and scientific terms used in the present application have the same meanings as those commonly understood by the skilled person in the technical field of the present application. The terms used in the specification of the present application are only for the purpose of describing specific embodiments and are not intended to limit the present application. The terms "including" and "having" and any variations thereof in the description and claims of the present application, as well as the accompanying drawings, are intended to cover non-exclusive inclusion. The terms "first", "second", etc. in the specification and claims of the present application or the accompanying drawings are configured to distinguish different objects, rather than to describe specific sequences or primary and secondary relationships.

Referring to "embodiments" in the present application means that specific features, structures, or characteristics described in conjunction with the embodiments can be included in at least one embodiment of the present application. The phrase appearing in various positions in the specification does not necessarily refer to the same embodiment, nor is it an independent or alternative embodiment that is mutually exclusive with other embodiments In the description of the present application, it should be noted that unless otherwise specified and limited, the terms "install", "connected with", "connect", and "attach" should be broadly understood. For example, they can be fixed connection, detachable connection, or integrated connection; they can be directly connected, or indirectly connected through an intermediate medium, or they can be communicated between interiors of the two components. For ordinary skilled person in the art, the specific meanings of the above terms in the present application can be understood based on specific circumstances.

In the present application, the term "and/or" is only a description of the association relationship of the associated object, indicating that there can be three types of relationships, such as A and/or B, which can indicate the existence of A alone, the existence of A and B simultaneously, and the existence of B alone. In addition, the character "/" in the present application generally indicates that the associated object is an "or" relationship In the embodiments of the present application, the same reference numerals represent the same components, and for simplicity, detailed descriptions of the same components are omitted in different embodiments. It should be understood that the thickness, length, width, and other dimensions of various components in the embodiments of the present application shown in the accompanying drawings, as well as the overall thickness, length, width, and other dimensions of the integrated device, are only illustrative examples and should not constitute any limitations for the present application.

The term "multiple" or "a plurality of" in the context of the present application refers to two or more (including two).

In the present application, a battery cell may include lithium-ion secondary battery cell, lithium-ion primary battery cell, lithium-sulfur battery cell, sodium lithium ion battery cell, sodium ion battery cell, or magnesium ion battery cell. The embodiments of the present application are not limited thereto. The battery cell can be in cylindrical, flat, cuboid, or other shapes, and the embodiments of the present application are not limited to thereto.

The battery mentioned in the embodiment of the present application refers to a single physical module that includes one or more battery cells to provide higher voltage and capacity. For example, the battery mentioned in the present application may include battery module or battery pack, etc. Battery generally include a casing used to encapsulate one or more battery cells. The casing can prevent liquid or other foreign objects from affecting the charging or discharging of the battery cell The battery cell includes an electrode assembly and an electrolytic solution, and the electrode assembly includes a positive electrode plate, a negative electrode plate, and a separator. The battery cell mainly relies on metal ions moving between the positive and negative electrode plates to operate. The positive electrode plate includes a positive electrode current collector and a positive electrode active substance layer which is applied on a portion of the surface of the positive electrode current collector. The positive electrode current collector includes a positive electrode current collecting part and a positive electrode tab connected to the positive electrode current collecting part. The positive electrode current collecting part is applied with a positive electrode active substance layer, while the positive electrode tab is not applied with a positive electrode active substance layer. Taking the lithium-ion battery as an example, the material for the positive electrode current collector can be aluminum, and the positive electrode active material layer includes the positive electrode active material. The positive electrode active material can be lithium cobalt oxide, lithium iron phosphate, ternary lithium, or lithium manganese oxide. The negative electrode plate includes a negative electrode current collector and a negative electrode active material layer which is applied on a portion of the surface of the negative electrode current collector. The negative electrode current collector includes a negative electrode current collecting part and a negative electrode tab connected to the negative electrode current collecting part. The negative electrode current collecting part is applied with a negative electrode active substance layer, while the negative electrode tab is not applied with a negative electrode active substance layer. The material for the negative electrode current collector can be copper, and the negative electrode active material layer includes the negative electrode active material. The negative electrode active material can be carbon or silicon, etc. The material of the separator can be PP (polypropylene) or PE (polyethylene), etc.

The battery cell further includes a shell, and an accommodation cavity is formed inside the shell to accommodate the electrode assembly. The shell can protect the electrode assembly from the outside to prevent external foreign objects from affecting the charging or discharging of the electrode assembly.

Due to the expansion of the battery cell during charging and discharging cycles, the expansion between the adjacent battery cells applies a force action to each other. If the action force between the two battery cells is too large, the electrolytic solution of the battery cell may be squeezed out, affecting the cycling performance of the battery cell. In view of the purpose of reducing the expansion force between the battery cells, the inventors disposed the adjacent battery cells to be spaced apart to reserve expansion space between adjacent battery cells for the expansion of the battery cell, thereby improving the cycling performance of battery cell.

The inventors found that after reserving a gap between the two battery cells, the battery cell is prone to offset and misalignment when subjected to external impact, leading to the risk of battery failure. In view of this, the inventors attempted to provide a buffer component at the gap between two battery cells, which can buffer and limit the battery cell, thereby improving the safety of the battery cell when subjected to vibration and impact.

When the buffer component is installed in the gap between two adjacent battery cells, it is in a compressed state. The smaller the gap is and the thicker the buffer component is, the greater the force applied by the battery cell to the buffer component, resulting in a greater reaction force applied by the buffer component to the battery cell. On the contrary, the larger the gap is and the smaller the thickness of the buffer component is, the smaller the force applied by the battery cell to the buffer component, resulting in a smaller reaction force applied by the buffer component to the battery cell.

When the reaction force of the buffer component on the battery cell is too large, the expansion degree of the battery cell during charging and discharging cycles will be severely limited, affecting the cycling performance of the battery cell.

When the reaction force of the buffer component on the battery cell is too small, the buffering effect of the buffer component is not obvious, and there is still a risk of offset and misalignment of the battery cell.

In view of this, the present application provides a technical solution that adjusts the reaction force applied by the buffer component to the battery cell by defining the spacing between the buffer component and the adjacent battery cell, thereby balancing the safety of the battery and the cycling performance of the battery cell.

The battery cell described in the embodiments of present application is applicable to the battery and the electricity consuming apparatus using the battery cell.

The electricity consuming apparatus can be vehicles, mobile phones, portable devices, laptops, ships, spacecraft, electric toys, electric tools, and so on. The vehicle can be a fuel powered vehicle, a gas powered vehicle, or a new energy vehicle. The new energy vehicle can be a pure electric vehicle, a hybrid electric vehicle, or an extended range vehicle, etc. The spacecraft include airplanes, rockets, space shuttles, and spaceships, among others. The electric toys include fixed or mobile electric toys, such as a game console, an electric car toy, an electric boat toy, and an electric airplane toy. The electric tools include metal cutting electric tools, grinding electric tools, assembly electric tools, and railway electric tools, such as an electric drill, an electric grinder, an electric wrench, an electric screwdriver, an electric hammer, an impact drill, a concrete vibrator, and an electric planer. The embodiments of the present application do not impose special restrictions on the above-mentioned electricity consuming apparatuses.

For the convenience of explanation, the following embodiments are explained taking the electricity consuming apparatus being a vehicle as an example.

FIG. 1 is a structural schematic diagram of a vehicle 1 provided in some embodiments of the present application.

As shown in FIG. 1, the interior of the vehicle 1 is provided with a battery 2, which can be installed in the bottom, the front, or the rear of the vehicle 1. The battery 2 can be used for the power supply of the vehicle 1. For example, the battery 2 can serve as the operating power supply of the vehicle 1.

The vehicle 1 can further include a controller 3 and a motor 4, and the controller 3 is used to control the battery 2 to supply power to the motor 4, for example, for the starting, navigation, and operating power requirements of the vehicle 1.

In some embodiments of present application, the battery 2 can not only serve as the operating power source for the vehicle 1, but also as the driving power source for the vehicle 1, replacing or partially replacing the fuel or the natural gas to provide the driving power for the vehicle 1.

Figure 2:
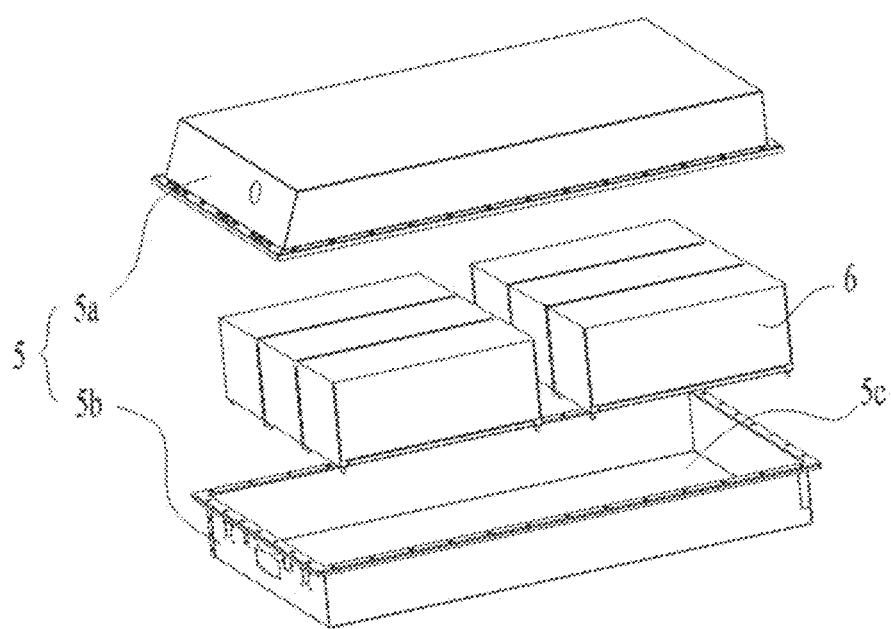
FIG. 2 is an exploded schematic diagram of a battery provided in some embodiments of the present application.

FIG. 2 is an exploded schematic diagram of the battery provided in some embodiments of the present application.

As shown in FIG. 2, the battery 2 includes a casing 5 and a battery cell (not shown) which is accommodated within the casing 5.

The casing 5 is used to accommodate the battery cell, and the casing 5 can be of various structures. In some embodiments, the casing 5 may include a first casing part 5a and a second casing part 5b, with the first casing part 5a and the second casing part 5b covering each other. The first casing part 5a and the second casing part 5b jointly define an accommodating space 5c for accommodating the battery cell. The second casing part 5b can be a hollow structure with an opening at one end, the first casing part 5a is a plate-like structure, and the first casing part 5a covers and closes the opening side of the second casing part 5b to form a casing 5 with an accommodating space. The first casing part 5a and the second casing part 5b2 can also be hollow structures with openings on one side. The opening side of the first casing part 5a covers and closes the opening side of the second casing part 5b to form a casing 5 with an accommodating space 5c. Of course, the first casing part 5a and the second casing part 5b can have various shapes such as cylinder, cuboid.

To improve the sealing performance after connecting the first casing part 5a and the second casing part 5b, sealing elements such as sealant, sealing rings, etc. can also be installed between the first casing part 5a and the second casing part 5b.

Assuming that the first casing part 5a covers and closes the top of the second casing part 5b, the first casing part 5a can also be referred to as the upper casing cover, and the second casing part 5b can also be referred to as the lower casing.

In a battery 2, there may be one or multiple battery cells. If multiple battery cells are provided, the multiple battery cells can be connected in series, parallel, or hybrid. Hybrid connection refers to both series and parallel connection among multiple battery cells 40. Multiple battery cells can be directly connected in series, parallel, or hybrid together, and then the whole composed of multiple battery cells can be accommodated in the casing 5. Of course, multiple battery cells can also be connected in series, parallel, or hybrid to form a battery module 6. Multiple battery modules 6 can then be connected in series, parallel, or hybrid to form a whole and accommodated in the casing 5.

Figure 3:
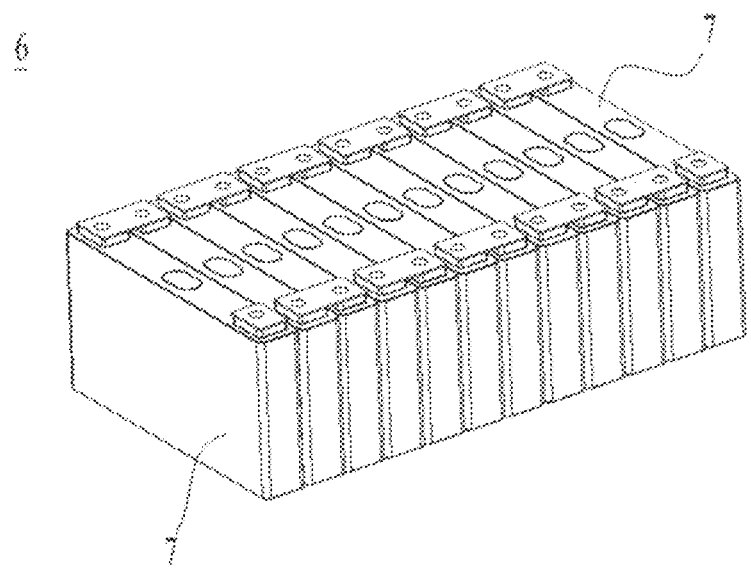
FIG. 3 is a schematic diagram of a battery module according to an embodiment of the present application.

FIG. 3 is a schematic diagram of a battery module in an embodiment of the present application.

In some embodiments, as shown in FIG. 3, multiple battery cells 7 are provided. The multiple battery cells 7 are first connected in series, parallel, or hybrid to form a battery module 6. Multiple battery modules 6 are then connected in series, parallel, or hybrid to form a whole and accommodated within the casing.

Multiple battery cells 7 in the battery module 6 can be electrically connected through a bus component to achieve parallel, series, or hybrid connection of multiple battery cells 7 in the battery module 6.

Figure 4:
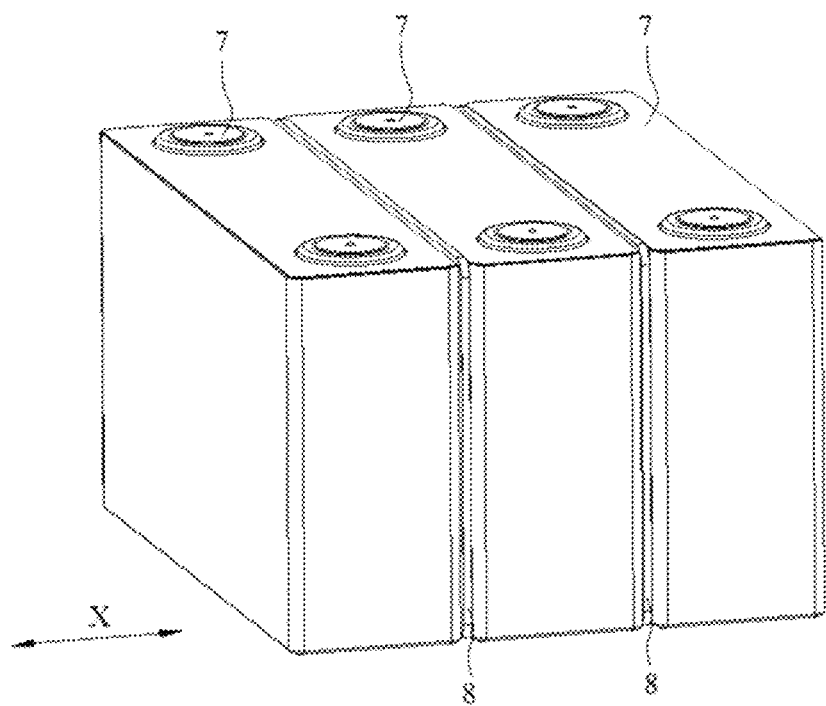
FIG. 4 is a structural schematic diagram of a battery provided in some embodiments of the present application.
Figure 5:
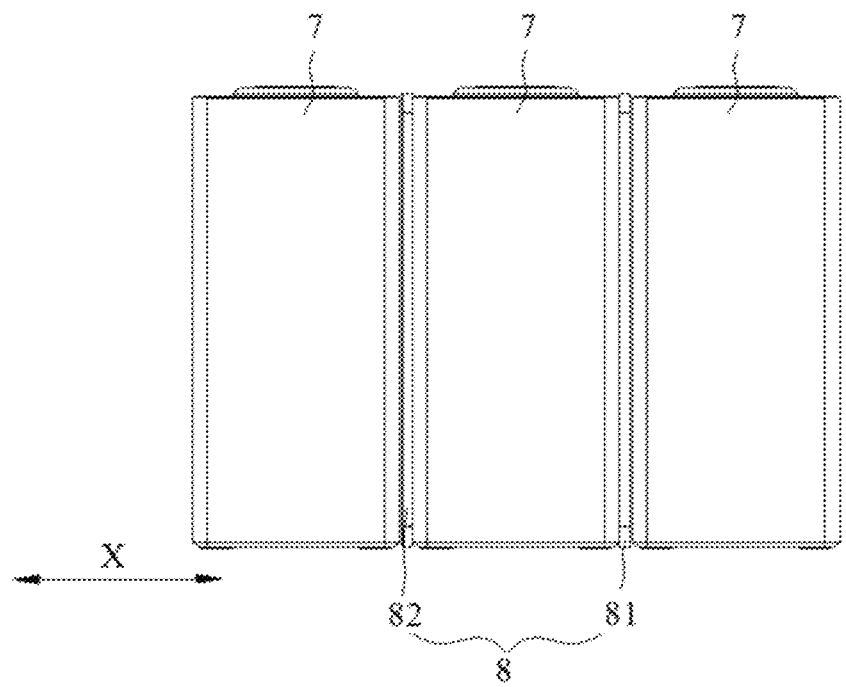
FIG. 5 is a front view schematic diagram of the battery shown in FIG. 4.
Figure 6:
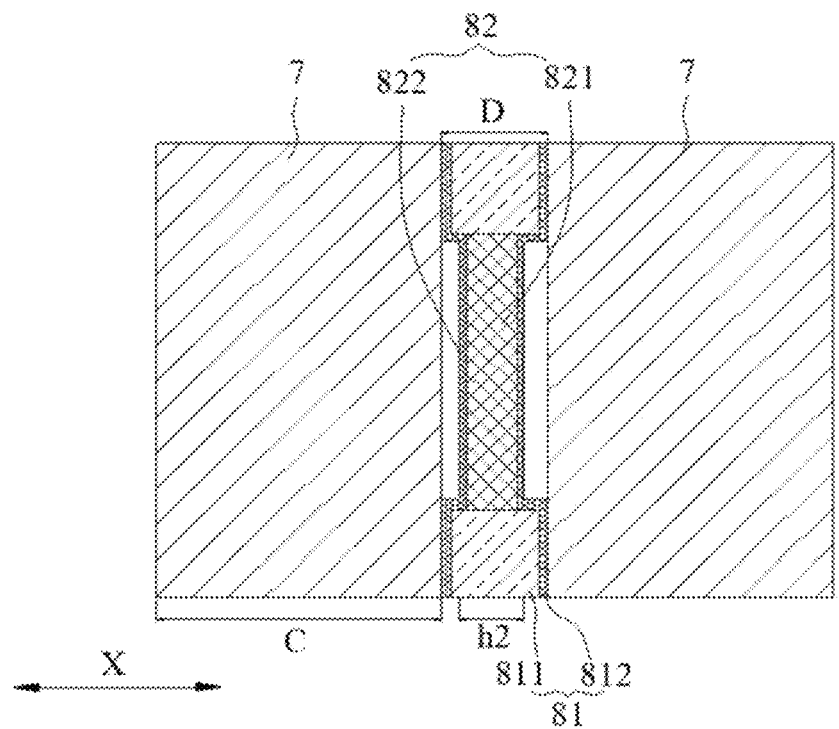
FIG. 6 is a structural schematic diagram of a battery provided in some other embodiments of the present application.

FIG. 4 is a structural schematic diagram of the battery provided in some embodiments of the present application, FIG. 5 is a front view schematic diagram of the battery shown in FIG. 4, and FIG. 6 is a structural schematic diagram of the battery provided in some other embodiments of the present application.

Figure 8:
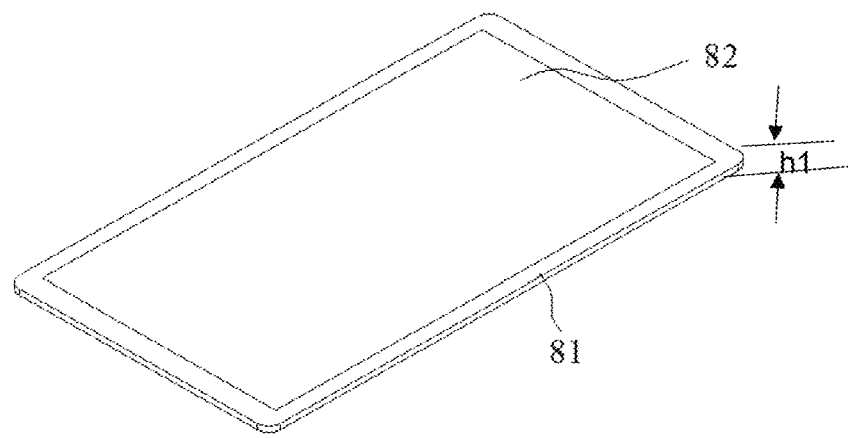
FIG. 8 is a structural schematic diagram of an isolation assembly of a battery provided in some embodiments of the present application.

As shown in FIGS. 4, 5, and 6, the battery of the embodiments of the present application includes multiple battery cells 7 and an isolation assembly 8. The multiple battery cells 7 are stacked in the first direction X. The isolation assembly 8 includes a buffer component 81 arranged between two adjacent battery cells 7. The area of the surface of the buffer component 81 which abuts against the battery cell 7 is S1, and the size of the buffer component 81 in the first direction X in an uncompressed state is h1, as shown in FIG. 8; the force F applied to the buffer component 81 by the battery cell 7 meets: 500N≤SF≤10000N in which the stress M of the buffer component 81 obtained according to the stress-strain curve of the buffer component 81 is $26*((h1-D)/h1)_2 - 0.09*(h1-D)/h1$ in Mpa, and by combining the area S1 of the surface of the buffer component 81 which abuts against the battery cell 7, the force F applied to the buffer component 81 by the battery cell 7 is obtained as F=S1*M.

In the embodiments of the present application, for a part of the battery cells 7, an isolation assembly 8 can be provided between the adjacent battery cells 7, or for all the battery cells 7, an isolation assembly 8 can be provided between every two adjacent battery cells 7.

The value of D can be measured in various ways, for example, the value of D can be measured using a vernier caliper.

When the battery cell 7 is in a fully charged state, the buffer component 81 can be compressed by the battery cell 7. When the battery cell 7 is fully discharged, the buffer component 81 can recover at least part of the deformation.

The embodiments of the present application do not limit the specific material of the buffer component 81, which needs to have a certain ability to generate deformation and be able to recover at least part of the deformation when the external force is removed. For example, it can be foam or rubber. As an example, when it is necessary to measure the size of the buffer component 81 along the first direction X in the uncompressed state, the buffer component 81 can be taken out and then measured using a vernier caliper to measure the size h1 of the buffer component 81 along the first direction X in the uncompressed state. As an example, the first direction X is parallel to the thickness direction of the buffer component 81.

The embodiments of the present application do not limit the shape of the buffer component 81, which specifically can be plate, block, or other shape.

The greater the value of F is, the greater the reaction force of the buffer component 81 received by the battery cell 7 is, and the lower the failure risk of the battery cell 7 under impact is, but the more easily the cycling performance of the battery cell 7 is also affected. If the force applied by the battery cell 7 to the buffer component 81 is too large, it will cause over design and result in poorer cycling performance of the battery cell 7.

The smaller the value of F is, the less significant the buffering effect played by the buffer component 81 is, and the greater the failure risk of the battery cell 7 under impact is.

In view of this, the inventors defined the numerical range of F to be greater than or equal to 500N, so as to increase the reaction force of the buffer component 81 on battery cell 7, thereby reducing the failure risk of the battery cell 7 under impact. The inventors set the numerical range of F to be less than or equal to 10000N, thereby restricting the reaction received by the battery cell 7 and improving the cycling performance of the battery cell 7 during charging and discharging. The embodiments of the present application can change the value of F by adjusting h1 or D. Therefore, when the battery is assembled, F can be adjusted by changing the value of D, thereby simplifying the assembly process of the battery.

Optionally, the value of F can be 1000N, 2000N, 3000N, 4000N, 5000N, 6000N, 7000N, 8000N, 9000N, or 10000N.

The embodiments of the present application can absorb the tolerance when multiple battery cells 7 are assembled into a group by adjusting the value of D.

By selecting the appropriate value of h1 according to the above formula and further defining the value of D, the buffer component 81 can not only meet the overall stiffness of the battery so that the failure risk of the battery is reduced, but also the limitation of the buffer component 81 on the expansion degree of the battery cell 7 is alleviated, and thus the cycling performance of the battery cell 7 during the charging and discharging is improved.

In some embodiments, the isolation assembly further includes a heat insulation component 82, which is arranged between two adjacent battery cells 7 and connected to a buffer component 81. The buffer component 81 is arranged along the periphery of the heat insulation component 82.

During the charging and discharging, the battery cell 7 generates heat, and the heat generated by multiple battery cells 7 can affect each other, leading to an increase in the temperature of the battery cell 7. This not only affects the cycling performance of the battery, but also poses a safety hazard to the battery cell 7. When one battery cell 7 experiences thermal runaway, the generated heat is transferred to adjacent battery cells 7, causing thermal runaway to occur in multiple battery cells 7 in succession, leading to safety hazards such as fire and explosion. In view of this, the inventors attempted to install a heat insulation component 82 between two adjacent battery cells 7. The heat insulation component 82 can reduce the heat transfer between the two adjacent battery cells 7, reduce the mutual influence of heat generated by the two adjacent battery cells 7, and maintain the normal cycling performance of battery cells 7.

The buffer component 81 is connected to the heat insulation component to improve the structural strength of the isolation assembly and meanwhile also facilitate the assembling.

The heat insulation component 82 has a heat insulation ability and certain elastic deformation ability. When the battery cell 7 is in a fully charged state, the heat insulation component 82 can be compressed by the battery cell 7. When the battery cell 7 is fully discharged, the heat insulation component 82 can recover at least part of the deformation.

The specific material of the heat insulation component 82 in the embodiments of the present application is not limited, and it needs to have a certain ability to generate deformation and be able to recover at least part of the deformation when the external force is removed.

The embodiments of the present application do not limit the specific shape of the heat insulation component 82, which can be in the form of a plate, block, or other shapes.

The larger the reserved expansion space between two battery cells 7 is, the smaller the effect of the expansion force received by the battery cell 7 is, but the lower the energy density of the battery is; the smaller the reserved expansion space is, the greater the effect of the expansion force received by battery cell 7 is, and the higher the energy density of the battery is.

The inventors found that the spacing between the heat insulation component 82 and the adjacent battery cell 7 directly affects the expansion space. In view of this, the present application adjusts the expansion space between the adjacent battery cells 7 by defining the spacing between the heat insulation component 82 and the adjacent battery cell 7, thereby balancing the energy density of the battery and the cycling performance of the battery cell.

In some embodiments, the size of the battery cell 7 along the first direction X is C, the size of the heat insulation component 82 along the first direction X in an uncompressed state is h2, and the maximum compression rate of the heat insulation component 82 during battery charging and discharging is a, C, h2, a, and D meet: $0.01\ C \le D-(1-a)h2 \le 0.2\ C$.

In an example, when it is necessary to measure the size h2 of the heat insulation component 82 in the first direction X in an uncompressed state, the heat insulation component 82 can be removed from between adjacent battery cells 7, and then the size h2 of the heat insulation component 82 in the first direction X in an uncompressed state can be measured using a vernier caliper. In an example, the first direction X is parallel to the thickness direction of the heat insulation component 82.

The compression rate is the ratio of the compression amount of the heat insulation component 82 to the total size of the heat insulation component 82 before compression. Specifically, if the size of the heat insulation component 82 in the first direction X in an uncompressed state is h2 and the size of the heat insulation component 82 in the first direction X after being compressed is h0, the compression rate of the heat insulation component 82 in the first direction X is $(h2-h0)/h2$.

The embodiment of the present application do not limit the size relationship between h2 and D, in other words, h2 can be greater than, less than, or equal to D.

The maximum compression rate a refers to the maximum compression rate of the heat insulation component 82 in the first direction X.

$D-(1-a)h2$ can be used to characterize the expansion space reserved by isolation assembly 8 for the adjacent battery cell 7. If the value of $D-(1-a)h2$ is larger, the expansion space is larger, the effect of the expansion force received by the battery cell 7 is smaller, and the cycling performance of the battery cell 7 is better, but the energy density of the battery is lower. If $D-(1-a)h1$ is too large, it will cause over design and result in a low energy density of the battery. The smaller the value of $D-(1-a)h1$ is, the smaller the expansion space is, and the greater the effect of the expansion force received by the battery cell 7 is, resulting in poorer cycling performance of the battery cell 7.

In view of this, the inventors limited the numerical range of $D-(1-a)h2$ to greater than or equal to $0.01\ C$, so as to reserve sufficient expansion space between two adjacent battery cells 7, which can reduce the action force between two adjacent battery cells 7 and thus improve the cycling performance of the battery cell 7. The inventors set the numerical range of $D-(1-a)h2$ to be less than or equal to $0.2\ C$, which can avoid the space between the two adjacent battery cell 7 being too large, reduce waste of internal space inside the battery, increase the space utilization rate, and improve the energy density of the battery.

Optionally, the value of $D-(1-a)h2$ can be $0.02\ C$, $0.04\ C$, $0.06\ C$, $0.08\ C$, $0.1\ C$, $0.12\ C$, $0.14\ C$, $0.16\ C$, or $0.18\ C$.

The above formula relates the size of the insulation component 82, the maximum compression ratio of the insulation component 82, and the spacing between two adjacent battery cells 7 in the first direction X together, and imposes numerical limitations on their relationship. Therefore, the above formula can be used to select the size of the insulation component 82 in the first direction X and the spacing between two adjacent battery cells 7 in the first direction X, which is convenient and efficient for meeting the heat insulation requirement of the battery cell 7 and balancing the energy density of the battery and the cycling performance of the battery cell 7.

The embodiments of the present application do not limit the size relationship between h2 and h1, in other words, h1 can be greater than, less than, or equal to h2.

Figure 7:
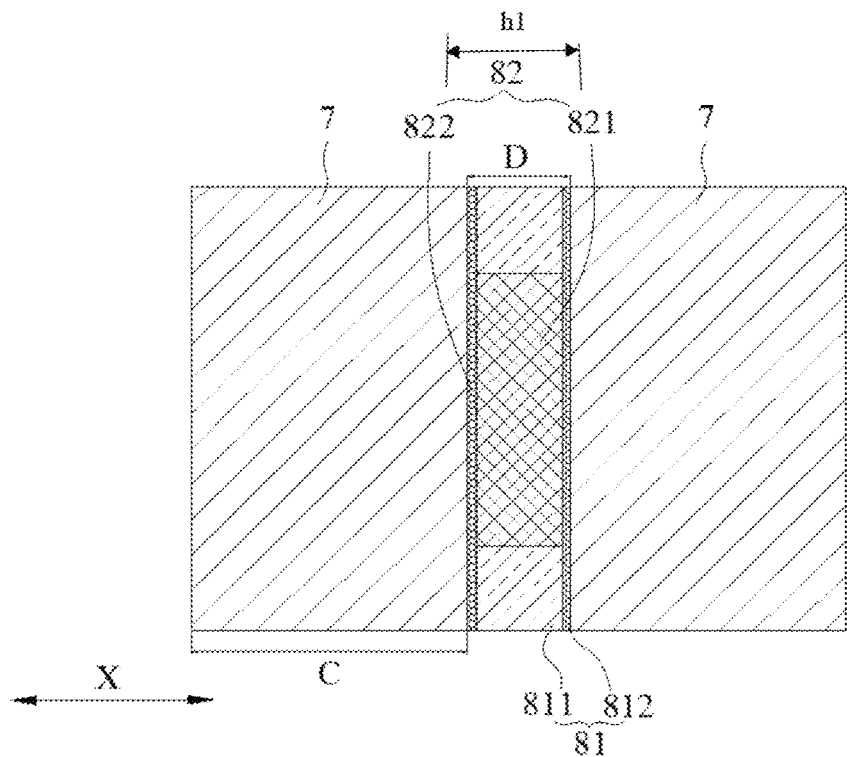
FIG. 7 is a structural schematic diagram of a battery provided in some further embodiments of the present application.

FIG. 7 is a structural schematic diagram of the battery provided in some further embodiments of the present application.

As shown in FIG. 6, when h1>D>h2, during assembling, the buffer component 81 is compressed first so that the buffer component 81 is used to play a role of cushioning and to absorb the grouping tolerance of the battery cells 7, and after the length of the buffer component 81 in the first direction X is compressed to D, the assembling is completed.

As shown in FIG. 7, when h2>h1>D, during assembling, the heat insulation component 82 is first compressed so that the buffer component 81 is used to play a role of cushioning and to absorb the grouping tolerance of the battery cells 7, and after the buffer component 82 is compressed to have a thickness equal to that of the buffer component 81, the squeezing continues. At this time, the buffer component 81 and the heat insulation component 82 both play a role of cushioning and absorb the grouping tolerance of the battery cells 7 together, and after the length of them in the first direction X is compressed to D, the assembling is completed.

When h1=h2>D, during assembling, the buffer component 81 and the heat insulation component 82 are compressed together firstly so that both play a role of cushioning and absorb the grouping tolerance of the battery cells 7 together, and after the length of them in the first direction X is compressed to D, the assembling is completed.

When h1>h2>D, during assembling, the buffer component 81 is compressed first so that the buffer component 81 is used to play a role of cushioning and to absorb the grouping tolerance of the battery cells 7. After the buffer component 81 is compressed to have the same thickness as that of the heat insulation component 82, the squeezing continues. At this time, the buffer component 81 and the heat insulation component 82 both play a role of cushioning and absorb the grouping tolerance of the battery cells 7 together, and after the length of them in the first direction X is compressed to D, the assembling is completed.

In some embodiments, the area of the surface of the buffer component 81 which abuts against the battery cell 7 is S1, and the area of the surface of the heat insulation component 82 which abuts against the battery cell 7 is S2. S1 and S2 meet S2/(S2+S1)≥0.7, wherein S1 and S2 represent the areas of the surfaces of the buffer component 81 and the heat insulation component 82 that abut against the battery cell 7 on one side, respectively.

Due to the fact that buffer component 81 also abuts against the battery cell 7, but the heat insulation effect of the buffer component 81 is limited, the heat insulation effect between the two adjacent battery cells 7 is mainly achieved by the heat insulation component 82. If the area of the buffer component 81 is large and the area of heat insulation component 82 is small, it will lead to insufficient heat insulation between the two battery cells 7, thereby affecting the cycling performance of the battery cell 7. In view of this, the inventors set S2/(S2+S1) to be greater than or equal to 0.7 to limit the area proportion of the heat insulation component 82 to the buffer component 81 so as to meet the heat insulation requirement between two battery cells 7.

In some embodiments, the size of the heat insulation component 82 in the first direction X in an uncompressed state is h2, and h2 and D meet: h2≤D.

The size h2 of the heat insulation component 82 along the first direction X in the uncompressed state is set to be less than or equal to the spacing D of the two adjacent battery cells 7 along the first direction X, so as to reduce the material consumption amount of the heat insulation component 82 and reduce the cost of the isolation assembly 8.

In some embodiments, h1 and D satisfy: h1>D.

The size h1 of the buffer component 81 in the first direction X in the uncompressed state is set to be greater than the spacing D between the two adjacent battery cells 7 in the first direction X. Therefore, after the battery cells 7 and the isolation assembly 8 are assembled, the buffer component 81 plays a role in improving the overall stiffness of the battery and absorbing the tolerance in assembling into a group.

In some embodiments, the heat insulation component 82 includes a heat insulation layer 821 and a first film layer 822 arranged on a surface of the heat insulation layer 821 facing the battery cell 7. The buffer component 81 includes a buffer layer 811 and a second film layer 812 arranged on a surface of the buffer layer 811 facing the battery cell 7. The first film layer 822 and the second film layer 812 are integrally provided.

The first film layer 822 and the second film layer 812 which are integrally provided can connect the heat insulation layer 821 and the buffer layer 811 to improve the overall structural strength of the isolation assembly 8.

In one embodiment, the first film layer 822 is arranged on both sides of the heat insulation layer 821 facing the battery cell 7, and the second film layer 812 is arranged on both sides of the buffer layer 811 facing the battery cell 7.

In one embodiment, the first film layer 822 is bonded to the heat insulation layer 821 using adhesive, and the second film layer 812 is bonded to the buffer layer 811 using adhesive.

The specific materials of the first film layer 822 and the second film layer 812 in the embodiments of the present application are not limited, for example, they can be polyimide film, high-temperature resistant polyester film, or polycarbonate film.

The first film layer 812 and the second film layer 822 have the functions of waterproof, moisture-proof, overall packaging, and increasing the flatness between the heat insulation component 82 and the buffer component 81.

In order to increase the flatness between the heat insulation component 82 and the buffer component 81, the first film layer 812 and the second film layer 822 can be a multi-layer film structure.

FIG. 8 is a structural schematic diagram of an isolation assembly provided in some embodiments of the present application.

As shown in FIG. 8, in some embodiments, the buffer component 81 surrounds the outer side of the heat insulation component 82.

Providing the buffer component 81 around the heat insulation component 82 not only plays a role of sealing and shaping, but also has good structural stability, with a larger area of the buffer component 81.

Figure 9:
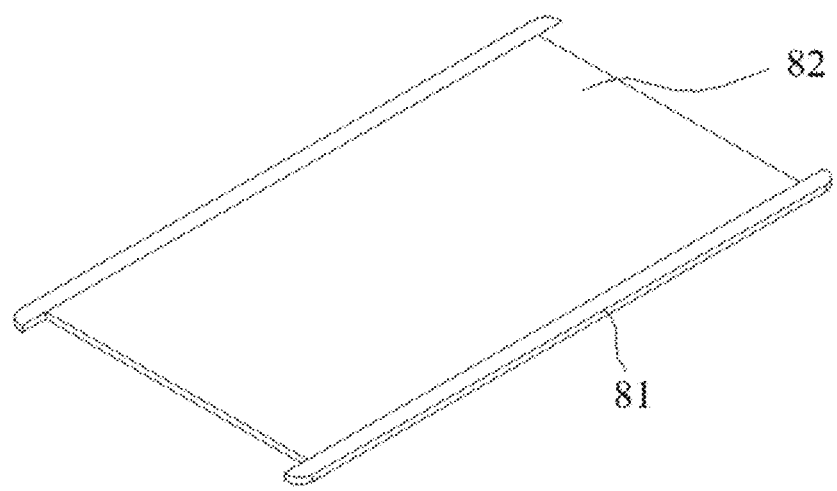
FIG. 9 is a structural schematic diagram of an isolation assembly of a battery provided in some other embodiments of the present application.

FIG. 9 is another structural schematic diagram of the isolation assembly provided in some embodiments of the present application.

As shown in FIG. 9, in one embodiment, the shape of the heat insulation component 82 on a side facing the battery cell 7 is cuboid, and the buffer component 81 is provided on one side or both sides of the heat insulation component 82.

In some embodiments, the heat insulation component 82 is clamped to the buffer component 81.

The heat insulation component 82 and the buffer component 81 adopt a clamping way, which is not only convenient and efficient, but also has good structural stability.

The embodiments of the present application do not limit the clamping way of the heat insulation component 82 and the buffer component 81, for example, a clamping structure of a buckle and a groove can be adopted.

The embodiments of the present application further provide an electricity consuming apparatus, including a battery in any of the above embodiments, the battery is configured to provide electrical energy.

According to some embodiments of the present application, referring to FIGS. 5 and 6, the embodiments of the present application provide a battery comprising multiple battery cells 7 and an isolation assembly 8. The multiple battery cells 7 are stacked in the first direction X. The isolation assembly 8 includes a heat insulation component 82 and a buffer component 81. The buffer component 81 and the heat insulation component 82 are arranged between two adjacent battery cells 7, and the buffer component 81 is arranged around the heat insulation component 82.

The area of the surface of the buffer component 81 which abuts against the battery cell is S1, and the size of the buffer component 81 in the first direction X in an uncompressed state is h1; the force F applied to the buffer component 81 by the battery cell 7 meets: 500N≤F≤10000N; wherein according to the stress strain curve of the buffer component 81, the stress M of the buffer component 81 is $26*(h1-D)/h1)^2 - 0.09*(h1-D)/h1$, by combining with the area S1 of the surface of the buffer component 81 which abuts against the battery cell 7, the force F applied by battery cell 7 to buffer component 81 is obtained as F=S1*M.

The size of the heat insulation component 82 along the first direction X in the uncompressed state is set to h2, and h1>D>h2.

The present application will be further explained in conjunction with embodiments as below.

In order to make the invention purpose, the technical solution, and the beneficial technical effects of the present application clearer, the present application will be further described in detail in conjunction with embodiments as below. However, it should be understood that the embodiments of the present application are only for the purpose of explaining the present application and not to limit the present application, and the embodiments of the present application are not limited to the embodiments provided in the specification. If specific experimental or operating conditions are not specified in the embodiments, they shall be made according to conventional conditions or conditions recommended by the material supplier.

Example 1 can be prepared according to the following steps:
(i) mixing the positive electrode active substance NCM523, the conductive agent acetylene black, and binder PVDF in a mass ratio of 96:2:2:2, adding the solvent NMP, and stirring under a vacuum mixer until the system is uniform so as to obtain the positive electrode slurry; applying the positive electrode slurry evenly on the aluminum foil, drying it at room temperature, transferring it to an oven for further drying, and then obtaining the positive electrode plate by cold pressing, slitting, and cutting;
(ii) mixing the mixture obtained from the negative electrode active material graphite according to difference mass ratio, the conductive agent acetylene black, the thickener CMC, and the binder SBR according to the mass ratio of 96.4:1:1.2:1.4, adding solvent deionized water, and stirring under a vacuum mixer until the system is uniform to obtain the negative electrode slurry; applying the negative electrode slurry evenly on the copper foil, drying it at room temperature, transferring it to an oven for further drying, and then obtaining the negative electrode plate by cold pressing, cutting, and cutting;
(iii) mixing ethylene carbonate (EC), methyl ethyl carbonate (EMC), and diethyl carbonate (DEC) in a volume ratio of 1:1:1 to obtain an organic solvent, then dissolving the fully dried lithium salt LiPF6 in the mixed organic solvent and preparing an electrolytic solution with a concentration of 1 mol/L;
(iv) using the polypropylene film with a thickness of 12 m as a separator;
(v) stacking the positive electrode plate, the separator, and the negative electrode plate together and wind them into multiple coils, then flattening them into a flat shape after winding to prepare the electrode assembly;
(vi) stacking two electrode assemblies and two buffer components and installing them inside the shell, and then welding the end cover and the shell and obtaining the battery cell through the processes including liquid injection, standing, formation, and shaping;
(vii) assembling two battery cells and the isolation assembly together, so that the isolation assembly is fixed between the two battery cells, and the isolation assembly includes a heat insulation component and a buffer components surrounding the outer side of the heat insulation component.

In step (vii), before assembling, a vernier caliper is used to measure the thickness h1 of the buffer component 81 as 3.3 mm and the area S1 as 2500 mm$^2$; after assembling, the spacing D between two battery cells 7 is 3 mm.

Cycle Performance Testing:

In a normal temperature environment, clamping two battery cells 7 from both sides of the first direction, charging the two battery cells 7 at a rate of 1 C, discharging them at a rate of 1 C, and conducting a full charge and full discharge cycle test until the capacity of one of the battery cells 7 decays to 80% of the initial capacity.

During the cycle, monitoring the status of the battery cell 7 in real-time. When the capacity of one of the battery cells 7 decays to 80% of its initial capacity, recording the number of cycles of that battery cell 7.

Example 2: the preparation method and the detection method of the battery cell in Example 2 refer to Example 1, with the difference that h1 is 3.5 mm and the area S1 is 5000 mm$^2$.

Example 3: the preparation method and the detection method of the battery cell in Example 3 refer to Example 1, with the difference that h1 is 4 mm and the area S1 is 5000 mm$^2$.

Example 4: the preparation method and the detection method of the battery cell in Example 4 refer to Example 1, with the difference that D is 2.5 mm, h1 is 3.3 mm, and the area S1 is 5000 mm$^2$.

Example 5: the preparation method and the detection method of the battery cell in Example 5 refer to Example 1, with the difference that D is 2.4 mm, h1 is 3.3 mm, and the area S1 is 5400 mm².

Comparative example 1: the preparation method and the detection method of the battery cell for comparative example 1 refer to Example 1, with the difference that h1 is 3.1 mm and the area S1 is 5000 mm².

Comparative example 2: the preparation method and the detection method of the battery cell for comparative example 2 refer to Example 1, with the difference that D is 2.8 mm, h1 is 4 mm, and the area S1 is 5000 mm².

The evaluation results of examples 1-5 are shown in Table 1.

|  | D (mm) | h1 (mm) | $26*((h1-D)/h1)^2 - 0.09*(h1-D)/h1$ | S1 (mm²) | F | the number of cycles |
|---|---|---|---|---|---|---|
| Example 1 | 3 | 3.3 | 0.20 | 2500 | 500 | 1980 |
| Example 2 | 3 | 3.5 | 0.50 | 5000 | 2500 | 1825 |
| Example 3 | 3 | 4 | 1.60 | 5000 | 8000 | 1730 |
| Example 4 | 2.5 | 3.3 | 1.48 | 5000 | 7400 | 1760 |
| Example 5 | 2.4 | 3.3 | 1.87 | 5400 | 10000 | 1635 |
| Comparative example 1 | 3 | 3.1 | 0.02 | 5000 | 100 | 1992 |
| Comparative example 2 | 2.8 | 4 | 2.31 | 5000 | 11565 | 1411 |

Referring to Examples 1-5 and Comparative examples 1-2, it can be seen that when the value of F is greater than 10000N, the number of cycles of the battery cell 7 is smaller, and the cycle performance of battery cell 7 becomes worse; when the value of F is less than 500N, the cycling performance is slightly improved just by a relative small extent. However, the compression amount of the buffer component after assembling is small, and the buffering effect of the buffer component is not significant. There is still a risk of offset and misalignment of the battery cell.

Therefore, the embodiments of the present application define the value of F to be greater than or equal to 500N and less than or equal to 10000N, which not only improves the cycling performance of the battery cell 7, but also reduces the risk of offset and misalignment of the battery cell 7.

Although the present application has been described with reference to preferred embodiments, various improvements can be made and equivalent components can be replaced without departing from the scope of the present application. In particular, as long as there is no structural conflict, the various technical features mentioned in each embodiment can be combined in any way. The present application is not limited to the specific embodiments disclosed in the text, but includes all technical solutions falling within the scope of the claims.

What is claimed is:

1. A battery, comprising:
   a plurality of battery cells stacked in a first direction; and
   an isolation assembly comprising a buffer component arranged between two adjacent battery cells, with a spacing between the two adjacent battery cells in the first direction being D, an area of a surface of the buffer component which abuts against the battery cell being S1, and a size of the buffer component in the first direction in an uncompressed state is h1;
   wherein a force F applied by the battery cell to the buffer component meets: 500N≤F≤10000N, in which a stress M of the buffer component obtained according to a stress strain curve of the buffer component is $26*((h1-D)/h1)_2-0.09*(h1-D)/h1$ in MPa, and by combining with the area S1 of the surface of the buffer component which abuts against the battery cell, the force F applied by the battery cell to the buffer component is obtained as F=S1*M,
   the isolation assembly further comprises a heat insulation component arranged between the two adjacent battery cells and connected to the buffer component; and the buffer component surrounds an outer side of the heat insulation component in a direction perpendicular to the first direction, and
   an area of a surface of the heat insulation component which abuts against the battery cell is S2, and S1 and S2 meet S2/(S2+S1)≥0.7.

2. The battery according to claim 1, wherein a size of the battery cell in the first direction is C, a size of the heat insulation component in the first direction in an uncompressed state is h2, a maximum compression rate of the heat insulation component during a charging and discharging of the battery is a, and C, h2, a, and D meet:

$$0.01C \leq D-(1-a)h2 \leq 0.2C.$$

3. The battery according to claim 1, wherein the buffer component covers an entirely of outer peripheral edges of the heat insulation component.

4. The battery according to claim 1, wherein the heat insulation component is clamped to the buffer component.

5. The battery according to claim 1, wherein a size of the heat insulation component in the first direction in an uncompressed state is h2, and h2 and D meet: h2≤D.

6. The battery according to claim 1, wherein the heat insulation component comprises a heat insulation layer and a first film layer arranged on a surface of the heat insulation layer facing the battery cell;
   the buffer component comprises a buffer layer and a second film layer arranged on a surface of the buffer layer facing the battery cell; and
   the first film layer and the second film layer are integrally provided.

7. The battery according to claim 1, wherein, before construction, h1 and D meet: h1>D.

8. An electricity consuming apparatus, comprising the battery according to claim 1, the battery being configured to provide electrical energy.

* * * * *